UNITED STATES PATENT OFFICE.

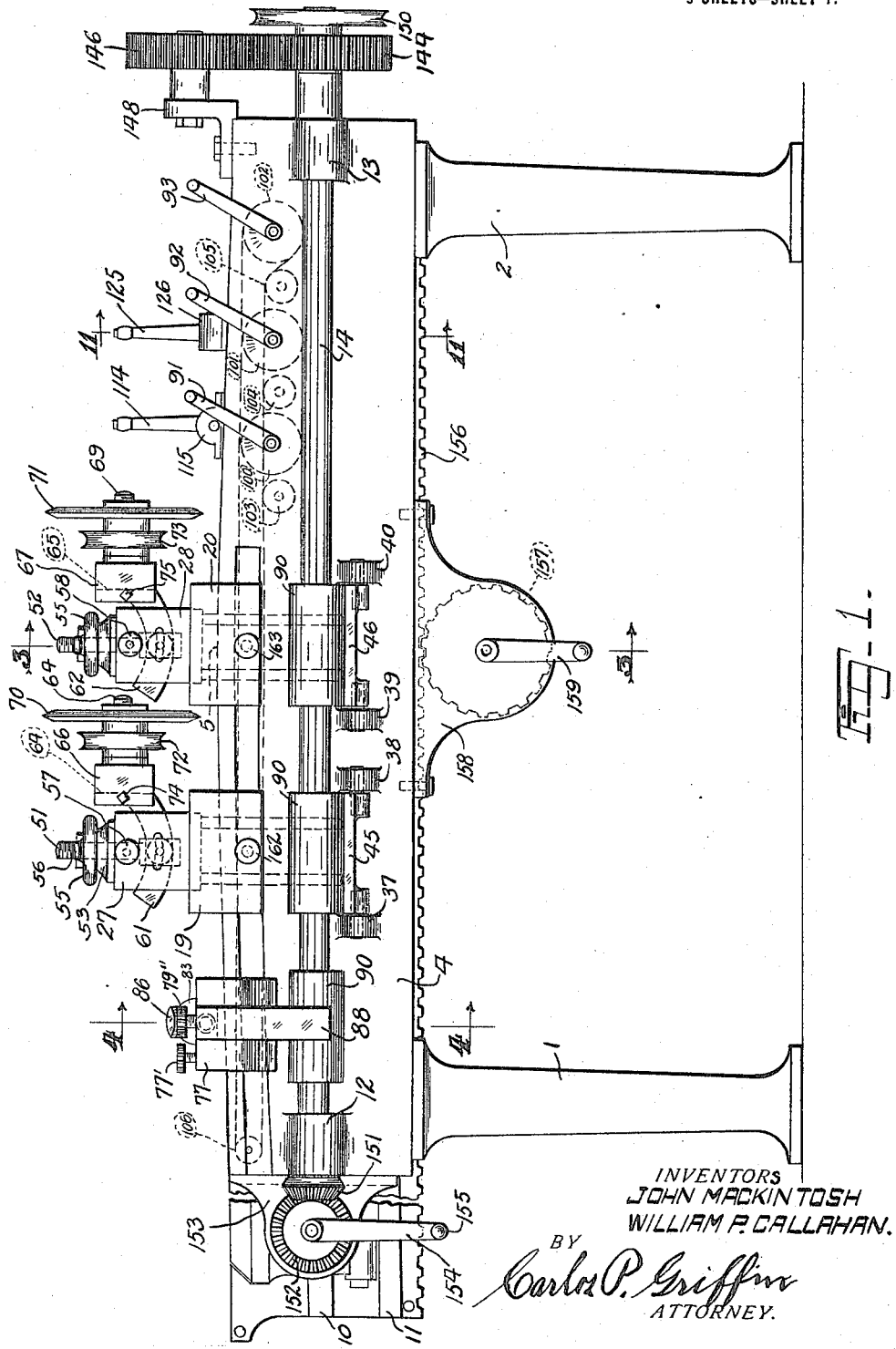

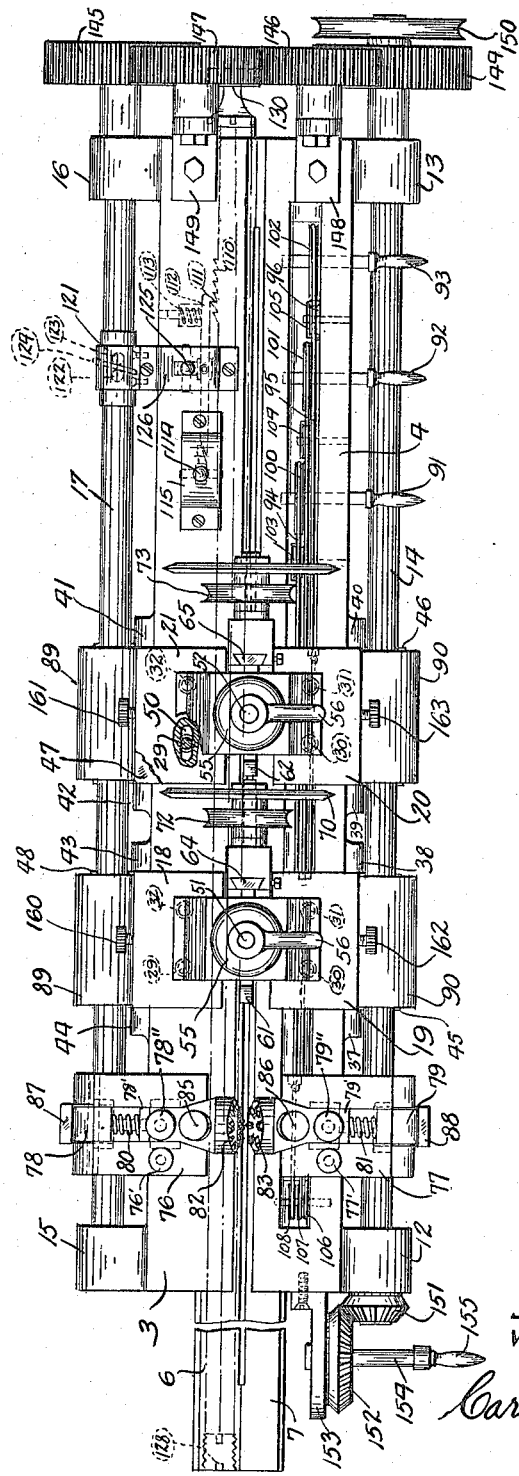

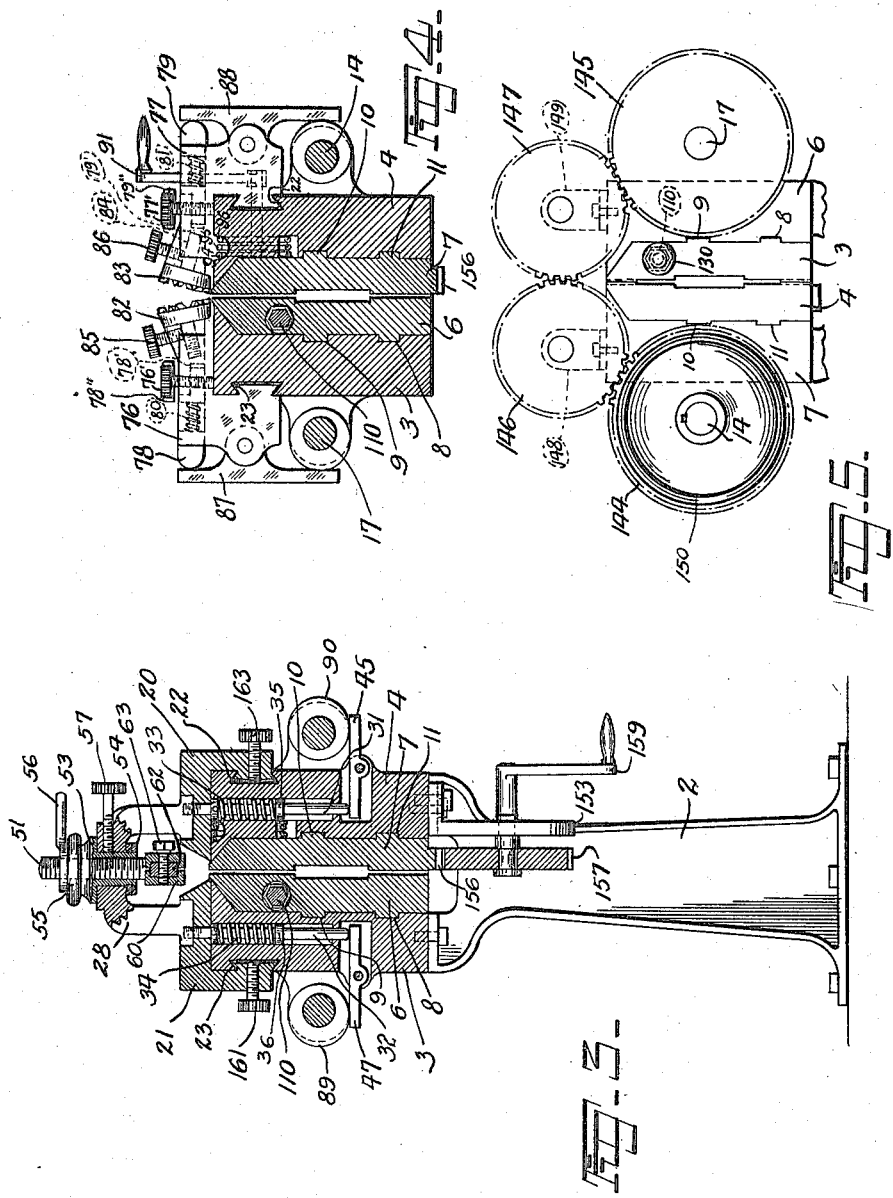

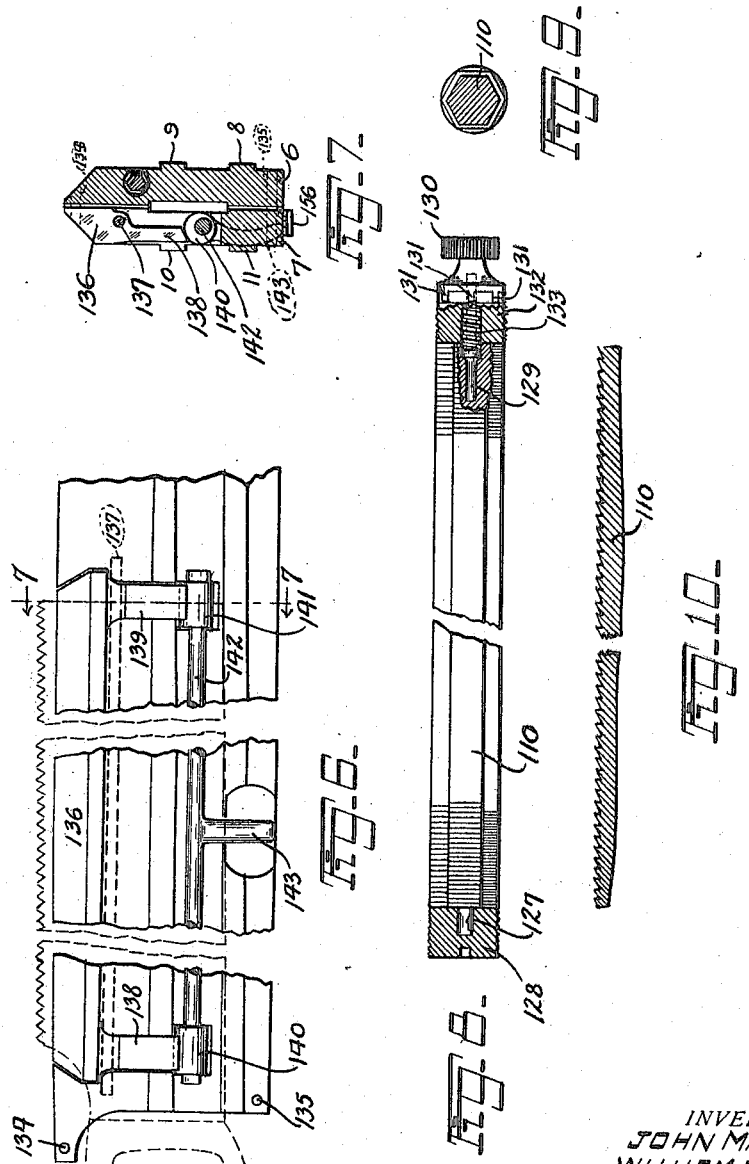

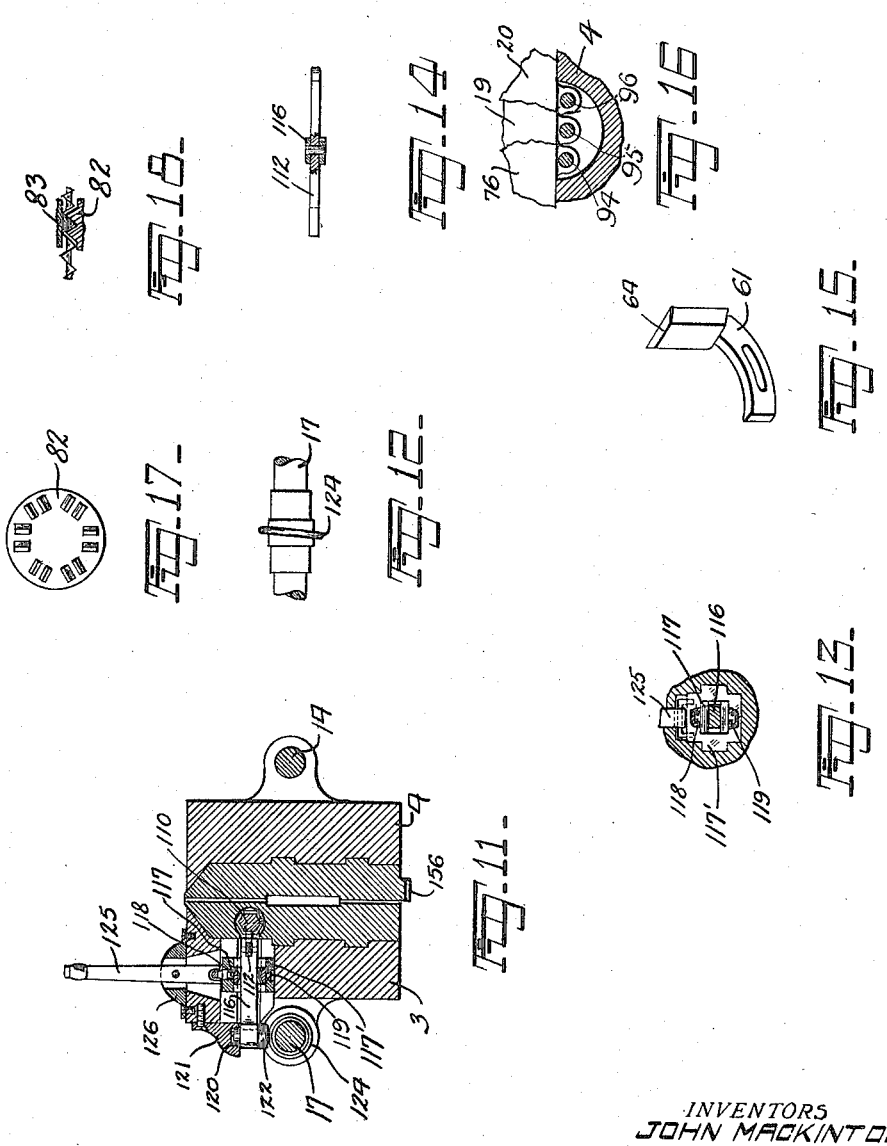

JOHN MACKINTOSH, OF MELROSE, AND WILLIAM P. CALLAHAN, OF OAKLAND, CALIFORNIA.

SAW-FILING MACHINE.

1,221,343. Specification of Letters Patent. Patented Apr. 3, 1917.

Application filed December 1, 1915. Serial No. 64,435.

*To all whom it may concern:*

Be it known that we, JOHN MACKINTOSH and WILLIAM P. CALLAHAN, citizens of the United States, residing at Melrose and Oakland, respectively, in the county of Alameda, State of California, have invented a new and useful Saw-Filing Machine, of which the following is a specification in such full and clear terms as will enable those skilled in the art to construct and use the same.

This invention relates to a saw filing machine intended especially for accurately and uniformly filing saws, the machine illustrated being particularly adapted to hand saws, although it will be apparent that it may be used for any kind of saws desired.

An object of the invention is to provide a saw filing machine which will reproduce in the saw the curve upon which the teeth are usually cut.

It will be understood by those skilled in the art that hand saws have the points of their teeth on a curve with a radius of a number of feet, this form having been found to be more suitable than to have the teeth on a straight line. The result of this necessitates very careful filing if the work is done by hand to prevent the points of the teeth from working off the given curve after repeated filings.

Another object of the invention is to provide means whereby the filing and setting apparatus may be adjusted to operate upon any saw regardless of the number of teeth to the inch within certain ranges.

Another object of the invention is to provide means whereby the saw will be filed and the teeth set all in a single operation.

Other objects of the invention will appear as the description proceeds.

An embodiment of the invention is shown in the drawing in which the same reference numeral is applied to the same portion throughout, but we are aware that there may be many modifications thereof within the scope of the appended claims.

Figure 1 is a side elevation of the complete machine, a portion of the saw vise being broken away for purposes of illustration, Fig. 2 is a plan view of the complete machine, the saw vise being broken off, Fig. 3 is a vertical sectional view on the line 3—3, Fig. 1 looking in the direction of the arrow, Fig. 4 is a vertical sectional view on the line 4—4, Fig. 1 looking in the direction of the double arrows, Fig. 5 is a view in end elevation of the machine looking at the right hand end and showing the arrangement of the gears for driving the operating shafts, Fig. 6 is a broken view in side elevation illustrating the saw clamp, Fig. 7 is a vertical sectional view of the saw clamp on the line 7—7, Fig. 6, Fig. 8 is a side elevation of the notched bar which is used for determining the amount the saw carriage has moved with each step, Fig. 9 is an end elevation of the notched bar shown in Fig. 8, Fig. 10 is a view in edge elevation with one series of the teeth used on the feed bar, Fig. 11 is a vertical sectional view on the line 11—11, Fig. 1, Fig. 12 is a side elevation of the cam used for operating the feed lever, Fig. 13 is a side elevation of the adjusting block through which the feed lever operates, Fig. 14 is a side elevation of the feed hook, Fig. 15 is a perspective view of the quadrant for supporting and adjusting the filing wheels, Fig. 16 is a broken sectional view showing the top of one of the table beams and illustrating the connections for moving the grinding blocks, Fig. 17 is a front elevation of one of the saw setting heads, and Fig. 18 is a horizontal sectional view through two of the saw setting heads showing the way the teeth are bent when set.

The numerals 1 and 2 indicate the supporting legs for two longitudinally extending beams 3 and 4, which beams have guide ways and shafts for the operation of the several parts of the machine.

The tops of the beams 3 and 4 are curved so that they are higher at the center as indicated at 5 upon a suitably large radius to give the desired curve to the points of the teeth of the saw being operated upon. The two beams 3 and 4 are spaced apart the width of the two flat members 6 and 7 which form the parts of the saw holder, said members 6 and 7 having guides 8, 9 and 10, 11 respectively which move in corresponding slots in the members 3 and 4 and which slots are curved the same as the top of the beams 3 and 4.

The beam 4 is provided with two lugs 12 and 13 which form the bearings for a shaft 14, while the beam 3 is provided with two lugs 15 and 16 which form the bearings for a similarly placed shaft 17, said shafts extending longitudinally the entire length of the two beams 3 and 4 on the outside thereof. Mounted on the top of the two beams are four slidable blocks 18, 19, 20 and 21, which blocks each have projections extending into a groove on the outside of each of the beams 3 and 4 as indicated at 22 and 23, Fig. 4. The blocks 18, 19 and 20, 21 respectively support an arched member 27, 28, each of which members is provided with two downwardly extending rods 29, 30, 31 and 32, which rods extend through the blocks 18 to 21 inclusive as illustrated in Fig. 3. Each rod is surrounded with a spiral spring as indicated at 33, 34, which springs bear on collars on said rods as indicated at 35, 36 and also bear on the underside of the blocks 18 to 21 inclusive, thereby holding the members 27, 28 normally down.

The beams 3 and 4 are provided with laterally extending lugs 37, 38, 39, 40, 41, 42, 43 and 44, which lugs form the bearings for four flat levers 45, 46, 47 and 48. It is to be observed that the rods connected with the arched members 27, 28 project downwardly so that their lower ends bear on the top of one end of the flat levers 45 to 48 inclusive as illustrated in Fig. 3, and it will also be observed that said rods extend through elongated slots in the beams 3 and 4 as illustrated at 50, Fig. 2, the object being to provide means whereby the position of the grinding wheels may be varied sufficiently so that the grinding wheels will properly act upon the teeth of saws of different gages, an adjustment being provided for each arched member as well as for the toothed setting member which is to be later described.

Each arched member 27 and 28 carries a screw as indicated at 51 and 52, the position of said screws being adjusted by means of the revoluble threaded nut which is carried by each arched member 53, said nut having a collar 54 at its lower end to prevent it from being displaced. A lock nut 55 with a hand lever 56 is also applied to each screw in order to secure it in a fixed position with respect to the nut 53, while each of the nuts 53 is secured in a fixed position by means of suitable screws 57, 58. Each screw 51, 52 carries a slotted head as indicated at 60 Fig. 3 through which screws the curved arms 61 and 62 respectively pass and in each instance as indicated at 63 a set screw is used to secure said arms in the desired position.

Each of the arms 61 and 62 has a head as indicated at 64 and 65 which fits into a dovetail slot in the heads 66, 67 which latter carry the stub shafts 68 and 69 on which the grinding wheels 70 and 71 rotate. The grinding wheels are driven by pulleys 72 and 73 respectively from any suitable source of power. The precise position of the heads 66 and 67 with respect to the heads 64 and 65 is determined by trial and suitable set screws 74 and 75 are used to fix the heads in the desired adjustment.

The saw setting device comprises two blocks 76 and 77 which are mounted on the top of the beams 3 and 4 adjacent one end thereof. These blocks are rigidly secured in a given position by means of set screws 76' and 77' and carry slidable plungers 78 and 79 respectively, which plungers are held out of contact with the saw by means of spiral springs 80, 81 and at their inner ends the plungers carry heads 82 and 83, each of which is provided with six series of teeth to correspond with the six series of teeth on the feed bar later to be described. The heads 82, 83 are set at such an inclination that only the lower portions of their faces touch the saw teeth and they are each provided with a shank as illustrated at 84 for securing them in the slidable plungers 78 and 79, set screws 85, 86 being used to hold them in the given adjustment. The plungers are separable into two parts at 78', 79' which two parts are connected by screws 78'', 79''.

The plungers 78, 79 are each moved toward the saw by means of the levers 87, 88 respectively, said levers being pivoted on the blocks 76, 77 and having one end thereof extending downwardly into a position to be moved by the cams 89, 90 on the shafts 14, 17. The block 77 and the two filing devices are adjusted longitudinally of the bed frame work by means of the levers 91, 92, 93 respectively, the beam 4 having a groove in its upper edge which carries lugs depending from the several blocks so that they can be connected with the cables 94, 95 and 96. The lever 91 operates a pulley 100, the lever 92 operates a pulley 101, while the lever 93 operates a pulley 102, over which the several cables pass, other pulleys 103, 104 and 105 being provided to hold the cables in close engagement with the pulleys 100 to 102 inclusive. At the other end of the machine the cables pass over three pulleys 106, 107 and 108.

The side of the beam 4 is provided with marks which will enable the user to know where to set the levers 91, 92, 93 for a given saw, while the block 76 is set by hand so that the positions of the heads 82, 83 will match the teeth of the saw being operated upon.

The saw clamp member 6 is provided with an opening extending longitudinally therethrough in which there is placed a hexagonal bar 110, said bar having six different series of teeth to enable six different sizes of saw teeth to be operated upon. The member 6 is slotted on the side so that the teeth on the bar 110 are accessible to the hook 111 on a lever 112, a spring 113 holding said hook normally in engagement with the teeth on the bar 110. The hook 111 is disengaged from the bar 110 by means of a lever 114 which is pivoted to a block 115 on the top of the back beam 3, the lower end of said lever being so positioned as to contact with one end of the lever 112 and thereby push the hook out of engagement with the feed bar when the lever 114 is pushed to the left, Fig. 2.

The lever 116 is pivotally connected with the lever 112 and passes through a block 117, which block is slidable thereon. The block 117 has pivot pins 118, 119 and it is mounted in another block 117', which is slidable transversely of the member 3, the lever 125 being used to shift it. At the outer end the lever has a pin 120 which is movable in a slot in the underside of a block 121 to hold said lever in a fixed position longitudinally, while on its underside the lever is provided with two small rollers 122, 123 which engage opposite sides of a worm cam 124 on the shaft 17. The block is slidably supported to move transversely of the beam 3 and it is moved by means of the lever 125, said lever being pivotally mounted on a block 126 on the top of the beam 3.

The object of this adjustment is to provide means whereby the throw of the lever 116 may be so adjusted as to move the saw holding vise just one tooth with each turn of the shaft 17 regardless of the precise length of the tooth then being worked upon.

The rod 110 has a trunnion 127 at one end which fits into a plug 128 which is screwed into the hole in which said rod fits at one end thereof. At the other end the rod has a non-circular opening to receive a pin 129 on a thumb wheel 130. The thumb wheel 130 is provided with teeth 131 which fit into notches in the outer end of a threaded plug 132 so as to enable any set of teeth on the feed rod to be placed in position to be operated on by the feed hook. The rod 129 is held in the position shown in Fig. 8 with its teeth 130 normally in contact with the plug 132 by means of a spiral spring 133.

The result of the foregoing construction is that when it is desired to turn the rod the thumb wheel is pulled out so that its teeth 131 do not engage the plug, whereupon the rod 110 can be turned to any desired position after which the thumb wheel is allowed to reëngage the plug 132, whereupon the rod will be held in the desired position.

The members 6 and 7 are separated far enough to receive the saw and are connected together adjacent the saw vise by means of two pins 134 and 135. The saw vise comprises a plate 136 which is pivotally connected to the member 7 by means of a rod 137, while the lower end of the plate 136 has two levers 138, 139, the lower ends of which bear on eccentric cams 140, 141. The cams 140, 141 are carried by a shaft 142 which shaft is rotated by means of the thumb lever 143 and the position of the cams is such that the saw is rigidly held against the member 6 by the plate or jaw 136 when the thumb lever 143 is in the position shown in Fig. 7 while it releases the saw when the thumb lever is raised about 90 degrees.

The shaft 14 is provided with a gear 144 while the shaft 17 is provided with a gear 145 and in order to drive the two shafts in precisely the same time these gears are in turn connected by two gears 146, 147 suitably supported on brackets 148, 149, while a pulley 150 is provided to transmit power to the machine. At the other end of the shaft 14 there is a bevel gear 151 in mesh with a bevel gear 152 carried by a bracket 153, the shaft 154 supporting said gear having a hand crank 155 to enable the machine to be operated by hand when desired. In order to enable the saw clamp to be run into and out of the machine at will the bottom of the saw clamp is provided with a rack as indicated at 156, which rack is engaged with a gear 157 supported in a depending bar 158 secured on the underside of the beam 4. The gear 157 is operated by means of the hand crank 159. It will, of course, be understood that whenever the saw clamp is to be run into or out of the machine by hand that the feed hook will be disengaged by the operation of the lever 114. Set screws 160, 161, 162 and 163 are used to secure the saw filing members rigidly in place when once they have been set in the desired adjustment.

The operation of the apparatus is as follows: The saw clamp frame is long enough so that it can be withdrawn from the machine to the left far enough to allow the saw to be inserted in place as indicated in Fig. 6, whereupon the lever 143 is turned down so that the saw will be rigidly clamped in place. Thereupon the saw holding clamp is pushed through the machine until some of the teeth will be adjacent each of the saw filing devices and the saw setting heads, whereupon the proper adjustment thereof will be made to correctly file and set the saw. As soon as the adjustments have been made the saw clamp will be pushed on through the machine until the first teeth at the heel of the saw will come under the first filing device. At the same time the feed bar will be turned so that it presents the proper series of teeth to the feed hook, so that precisely one tooth will be advanced with each motion thereof, whereupon the machine is ready to be started and will completely file and set the saw without further attention.

It will, of course, be apparent that all saws will be filed with the curve or camber of this particular machine, but this may be changed if a machine is to be built for other types of saws.

While the term "files" has been used herein, it will be understood that suitable grinding stones may be used in the place of the ordinary steel files if desired.

Having thus described our invention what we claim as new and desire to secure by Letters Patent of the United States, is as follows, express reservation being made of permissible modifications:

1. A saw filing machine comprising a rigid bed having curved guide ways, a saw clamp movable longitudinally through said curved guideways, a pair of revoluble saw files carried thereby, means to raise and lower the saw files to sharpen the teeth of a saw, means to adjust the position of the saw files to be capable of operating on different sized teeth, means to move the saw clamp through the machine step by step, means to adjust the step by step movement to correspond with the spacing of the teeth of the saw being operated on, and means to set the saw while being moved through the machine.

2. A saw filing machine comprising a rigid bed, a saw clamp movable longitudinally therethrough, slidable heads on the bed, a revoluble file carried by each head, means to adjust the position of the saw files to sharpen the teeth of a saw, means to raise and lower the saw files intermittently, a reciprocating saw set, means to move the saw clamp and saw carried thereby step by step through the machine, and means to adjust the step by step movement to correspond with the spacing of the size of the teeth of the saw.

3. A saw filing machine comprising a rigid bed having curved guide ways, a saw clamp movable longitudinally through said curved guide ways, a pair of revoluble saw files supported upon the bed, means to adjust the angles of the saw files, means whereby the supports of the saw files may be shifted to accommodate different sizes of saw teeth, a saw, oppositely reciprocable saw sets, means to raise and lower the saw files and to oppositely reciprocate the saw sets, means to move the saw clamp through the machine step by step, and means to adjust the step by step movement to the spacing of the saw teeth.

4. A saw filing machine comprising a rigid bed, a saw clamp movable longitudinally therethrough, a revoluble shaft on each side of the bed, gears connecting said shafts, a pair of revoluble saw files supported above the bed, levers pivotally connected to the bed on opposite sides thereof, pins extending downwardly from the saw file supports into contact with said levers, cams on the shafts whereby the levers are oscillated to raise and lower the saw files, means to move the saw clamp step by step through the machine, and means to adjust the step by step movement to the spacing of the saw teeth.

5. A saw filing machine comprising a rigid bed, a saw clamp slidable therethrough, supports on the bed for a pair of revoluble saw files, means to adjust the angle of the saw files, means to adjust the position of the supports for the saw files to accommodate different sizes of saw teeth, pins extending downwardly from the saw file supports, levers contacting with said pins for the operation thereof, cams in contact with the levers, means to rotate said cams to operate the levers to raise and lower the files, means to move the saw clamp and saw carried thereby step by step through the machine, the steps corresponding to the spacing of the saw teeth, a pair of transversely reciprocating saw sets, and means to reciprocate said saw sets to effect the setting of the teeth of the saw while the saw is moving through the machine.

6. A saw filing machine comprising a rigid bed having guide ways, a saw clamp movable longitudinally through said guide ways, a pair of adjustable blocks supported by the guide ways, a rotary saw file carried by each block, a ratchet bar carried by the saw clamp, means to rotate the files, a shaft extending longitudinally of the bed and having cams thereon to raise and lower the saw files, and a pawl for moving the saw clamp through the machine step by step with each movement of the saw files, and means whereby the distance which said clamp is moved with each step may be adjusted to correspond with the size of the teeth of the saw being sharpened.

7. A saw filing machine comprising a rigid bed having curved guide ways extending therethrough, a saw clamp slidable in said guide ways, revoluble saw files adjustably supported on said bed, means to raise and lower the saw files to sharpen the teeth of a saw held by the clamp, a ratchet bar carried by the saw clamp, means to raise and lower the revoluble saw files, a pawl to engage the ratchet bar to move the clamp through the machine step by step, and means to adjust the step by step movement to correspond with the spacing of the teeth of a given saw.

In testimony whereof we have hereunto set our hands this 20th day of November A. D. 1915.

JOHN MACKINTOSH.
WILLIAM P. CALLAHAN.

Copies of this patent may be obtained for five cents each, by addressing the "Commissioner of Patents, Washington, D. C."